United States Patent [19]

Yamashita

[11] Patent Number: 5,184,242
[45] Date of Patent: Feb. 2, 1993

[54] SUPERVISORY CIRCUIT FOR OPTICAL REPEATER

[75] Inventor: Shuji Yamashita, Tokyo, Japan

[73] Assignee: NEC Corporation, Tokyo, Japan

[21] Appl. No.: 628,024

[22] Filed: Dec. 17, 1990

[30] Foreign Application Priority Data

Dec. 15, 1989 [JP] Japan ................................. 1-326899

[51] Int. Cl.⁵ .......................................... H04B 10/08
[52] U.S. Cl. .................................................. 359/177
[58] Field of Search ............... 455/601, 8, 9; 375/3.1; 359/177; 340/425, 825.16, 825.18

[56] References Cited

U.S. PATENT DOCUMENTS 4,887,309 12/1989 Andersson ........................... 455/601
4,973,953 11/1990 Shimokawa .

FOREIGN PATENT DOCUMENTS 0085940 8/1983 European Pat. Off. ................. 455/9
0072514 6/1978 Japan ..................................... 455/9
0045637 3/1986 Japan ..................................... 455/9
1256221 9/1986 U.S.S.R. ................................. 455/9

OTHER PUBLICATIONS

C. D. Anderson et al, "The SL Supervisory System", IEEE Journal on selected areas in communications, vol. SAC-2, No. 6, Nov. 1984, pp. 1031–1037.

Primary Examiner—Edward L. Coles, Sr.
Assistant Examiner—L. Pascal
Attorney, Agent, or Firm—Sughrue, Mion, Zinn, Macpeak & Seas

[57] ABSTRACT

A supervisory circuit for optical repeaters has a selective decoder circuit for selecting and decoding either one of control signals for monitoring which are separated from individual transmission signals being propagated over the first channel and the second channel. When noise ascribable to a fault occurs on the first channel, a signal path connecting to the selective decoder circuit for inputting a control signal from the first channel is interrupted. Noise of this kind is detected in terms of an input signal level which does not lie in the frequency band of control signals.

4 Claims, 2 Drawing Sheets

SUPERVISORY CIRCUIT FOR OPTICAL REPEATER

BACKGROUND OF THE INVENTION

The present invention relates to a supervisory circuit associated with optical repeaters of an optical repeating system for detecting control signals which are superposed on data to monitor the operations of the repeaters while the system is in service.

A prerequisite with long-haul optical repeating systems, especially undersea optical repeating systems, is that a terminal be provided with remote controlling and monitoring capabilities for monitoring the operations of the repeating paths, localizing failures, switching a redundancy system, etc. Since assigning an exclusive channel independent of transmission channels for a remote monitoring purpose is disadvantageous for economy reasons, it has been customary to superpose low-speed control signals on transmission path code sequences in the format of presence/absence of parity violations. Such an approach allows control signals to be transmitted even during communication by being superposed on data. A supervisory circuit which may be associated with these types of optical repeaters for detecting the control signals is taught by, for example, C. D. Anderson et al. in "The SL Supervisory System", IEEE Journal on selected areas in communications, VOL SAC-2, No. 6, Nov. 1984, pp. 1031–1037. As this paper indicates in FIG. 8, a conventional repeater supervisory circuit regenerates control signals by detecting bursts which appear in response to parity violations in the transmission path code sequences.

Specifically, a transmission path code is implemented with a 24B1P block format, i.e., a format wherein even parity bit is added to twenty-four bits of data to constitute a 25-bit block. The even parity is replaced with an odd parity every N blocks (N = 224 in the above-mentioned paper) only during the mark period of a low-speed (33 ⅓ baud rate) binary control signal. Data in the code being propagated over the path has been scrambled and randomized. Hence, when no control signal is superposed on data, a block with an even parity continuously appears with the result that the average DC level of codes on the path remains substantially constant throughout the blocks. While a control signal is superposed on data, a block with an odd parity appears at a predetermined period (25 × N bits) during the mark period of the control signal. Every time a block with an odd parity appears, the average DC level increases or decreases to produce an AC component in a burst. In the paper, since the rate (fb) of the transmission path code sequence is 295.6 Mbps, the frequency fv of the bursts is nearly equal to 26.4 kHz, i.e. $fv = fb/2(2 \times 25 \times N)$.

The conventional supervisory circuit separates the above-stated burst by a bandpass filter whose center frequency is fv, amplifies and rectifies the separated burst, passes the amplified and rectified burst through a low pass filter to detect a control signal, and then causes a supervisory logic circuit to process the control signal. When a control signal appears almost simultaneously on an up-going and a down-going channel, the supervisory logic circuit selects a control signal arrived first and inhibits the input of the other control signal until the above-mentioned sequence of steps completes.

A problem with the conventional repeater supervisory circuit described above is, as follows. Assume that the noise level has increased due to a fault occurred on the up-going channel. As the component having the frequency fv and contained in the noise becomes great, the supervisory logic circuit inhibits the input of a control signal from the down-going channel and thereby makes the access of an originating terminal transmitting a control signal impossible. For example, when the up-going channel is shut off, a photodetector receiving an optical signal from the up-going channel is caused into a no-input state with the result that microplasma noise being generated by the repeater sharply increases. In response, the component having the frequency fv and arriving at the supervisory circuit assigned to the up-going channel also increases. Then, it is determined that a control signal on the up-going channel has arrived, resulting in the erroneous operation as stated above.

BRIEF SUMMARY OF THE INVENTION

It is therefore an object of the present invention to provide a supervisory circuit for optical repeaters which is capable of receiving, even when a fault occurs on the first channel, a control signal from the second channel.

A supervisory circuit for optical repeaters of the present invention has a selective decoder circuit for selecting and decoding either one of the two control signals which are separated from individual transmission signals on the first channel and the second channel. When noise ascribable to a failure, or trouble noise, occurs on the first channel, the supervisory circuit interrupts a signal path adapted to transfer a control signal separated from a transmission signal on the first channel to the selective decoder circuit.

Means for detecting the above-mentioned trouble noise on the first channel may preferably comprise a circuit arrangement wherein input signal components not lying in the frequency band of control signals are separated by a bandpass filter, and the filter output level is detected.

The present invention eliminates an occurrence of regarding noise ascribable to a failure on the first channel as a control signal and fed to and selected by the selective decoder circuit and, as a result, the input of a control signal on the second channel is inhibited.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
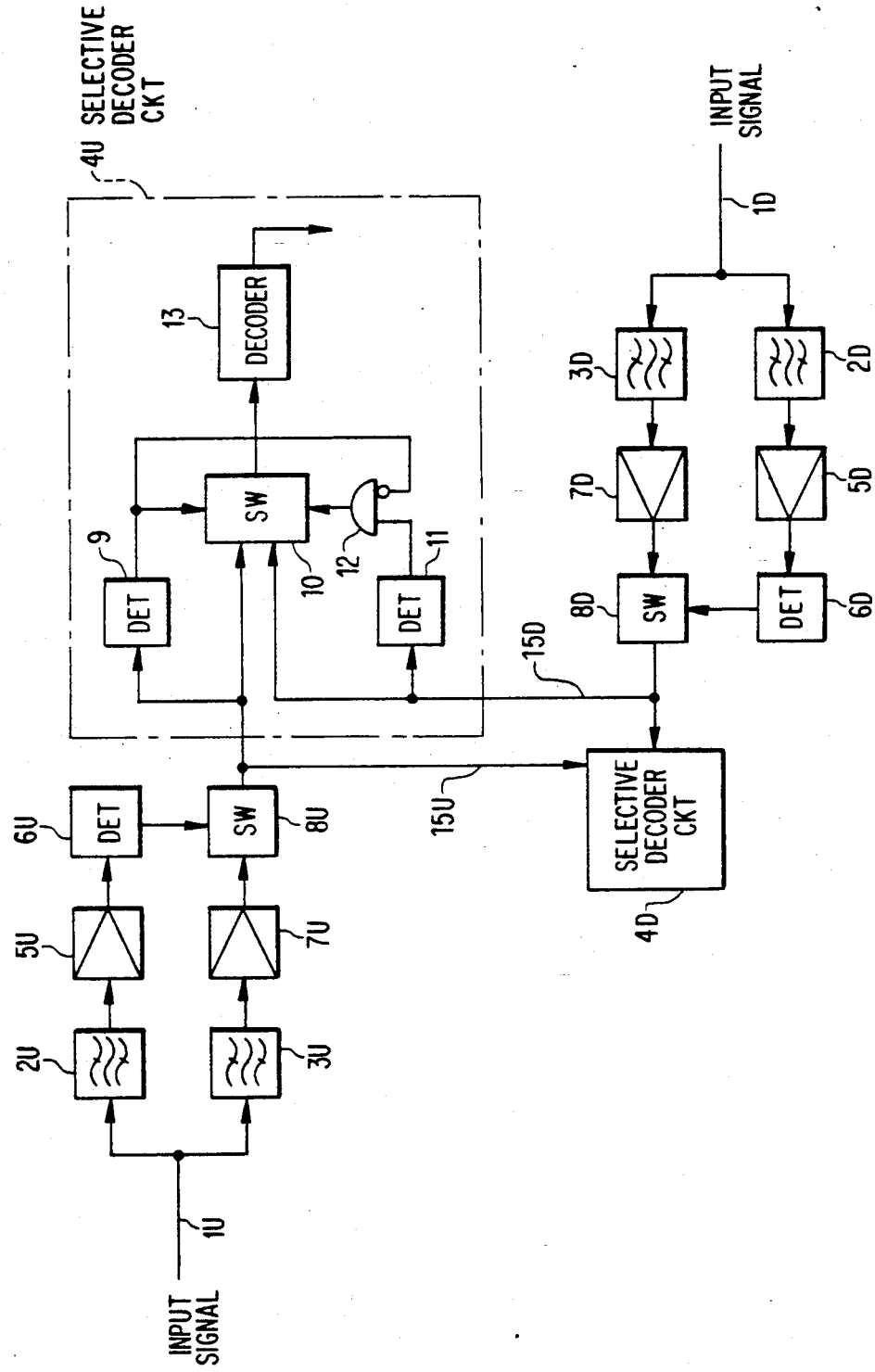
FIG. 1 is a block diagram schematically showing a repeater supervisory circuit embodying the present invention.
Figure 2:
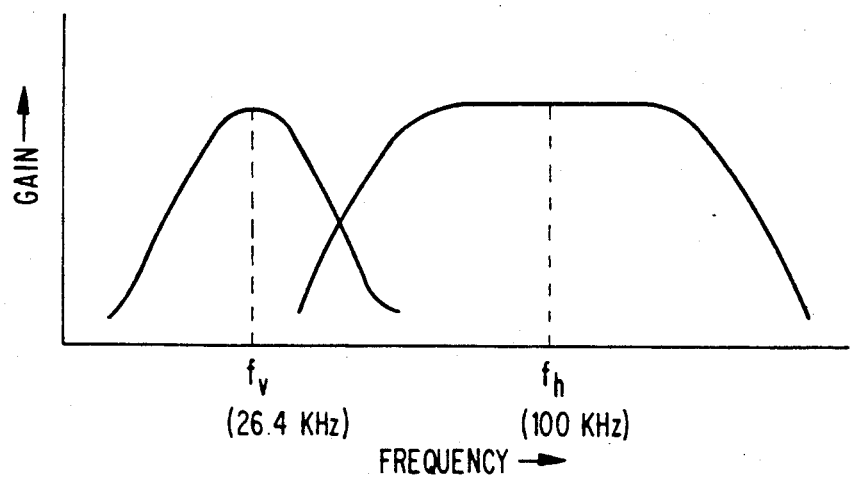
FIG. 2 is a graph indicative of the frequency characteristic of a bandpass filter included in the illustrative embodiment.

Referring to FIG. 1 of the drawings, a supervisory circuit embodying the present invention is shown and includes bandpass filters 3U and 3D. The bandpass filters 3U and 3D separate burst components having a frequency fv (in the embodiment, 26.4 kHz) and appearing in the mark period of monitoring control signals from respectively, input signals 1U and 1D coming in over an up-going and a down-going channel. Amplifiers 7U and 7D amplify the output signals of the bandpass filters 3U and 3D, respectively. The filters 3U and 3D and amplifiers 7U and 7D constitute a conventional part of the circuitry. The illustrative embodiment additionally has bandpass filters 2U and 2D, amplifiers 5U and 5D, level detector circuits (DET) 6U and 6D, and analog switches (SW) 8U and 8D. As shown in FIG. 2, the bandpass filters 2U and 2D each has a center frequency located at a point where the control signal component having the frequency fv is sufficiently small (in the embodiment 100 kHz). For example, when the noise component of the input signal 1U increases due to a failure occurred on the up-going channel, components in the frequency band adjoining the frequency fh also increase. The bandpass filter 2U, amplifier 5U and level detector circuit 6U cooperate to detect the levels around the frequency fh. When the level being detected exceeds a threshold, the analog switch 8U is turned off to prevent a noise signal on the first channel from reaching a selective decoder circuit 4U.

The output of the analog switch 8U is connected to selective decoder circuits 4U and 4D. The selective decoder circuits 4U and 4D each selects and decodes a control signal appearing on the first channel by giving priority thereto and transfers the decoded control signal to a control section, not shown. Specifically, when trouble noise ascribable to a fault does not exist, the analog switch 8U is turned on to route the input signal 1U to a level detector circuit (DET) 9 and an analog switch (SW) 10 via the bandpass filter 3U and amplifier 7U. The output of the analog switch 8D on the down-going channel is also connected to the analog switch 10. The level detector 9 determines if a control signal from the first channel exists by detecting the, output level of the analog switch 8U assigned to the first channel (up-going channel). A level detector circuit (DET) 11 determines whether or not the control signal from the second channel (down-going channel) exists. The level detector circuits 9 and 11 each so controls the analog switch 10 to connect, on detecting the associated control signal, the control signal to a decoder circuit 13. An inhibit gate 12 is connected between the level detector circuit 11 and the analog switch 10. In this configuration, when a control signal exists on the first channel, the inhibit gate 12 prevents the control signal on the second channel from being coupled to the analog switch 10. The decoder circuit 13 decodes and shapes a burst signal having the frequency fv and selectively connected thereto from the analog switch 10, thereby regenerating a binary control signal.

The selective decoder circuit 13 assigned to the down-going channel functions in the same manner, i.e., it selects and decodes a control signal appearing on the down-going channel by giving priority thereto.

As stated above, in the illustrative embodiment, when noise ascribable to a fault occurs on the first channel, the first channel is prevented from connecting to a selective decoder circuit which operates on a first-channel-priority basis. This prevents the reception of a control signal from the second channel from failing due to a fault on the first channel.

While the embodiment is implemented with a selective decoder circuit operable with the first-channel-priority principle, it is also practicable with a first-come-first-served type selective decoder circuit which gives priority to either one of control signals which may be detected almost simultaneously on both of the up-going and down-going channels. This is also successful in preventing, when noise due to a fault occurs on one channel, the reception of a control signal from the other channel from failing.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplate that the appended claims will convey any modifications or embodiments as fall within the true scope of the invention.

I claim:

1. A supervisory circuit for an optical repeater, comprising:

separating means for separating a control signal from a transmission signal, said control signal being superposed on said transmission signal being propagated over a first channel;

detecting means responsive to said transmission signal for detecting a predetermined frequency component of noise attributed to a fault on said first channel and generating a signal indicating whether or not said noise exists on said first channel, said predetermined frequency component being different from a frequency component of said control signal;

switching means for sending in response to said signal indicating that said noise does not exist, said control signal separated by said separating means and intercepting said control signal separated by said separating means, in response to said signal indicating that said noise exists; and selective decoding means for selecting and decoding either said control signal on said first channel fed from said switching means or another control signal fed from a second channel, depending on a combination of presence/absence of said control signals.

2. A supervisory circuit as claimed in claim 1, wherein said separating means comprises:

first bandpass filter means for passing main frequency band components of said control signal on said first channel; and first amplifier means for amplifying an output signal of said first bandpass filter means; and wherein said detecting means comprises:

second bandpass filter means for passing frequency band components of said noise other than said main frequency band components of said control signal on said first channel;

second amplifier means for amplifying an output signal of said second bandpass filter; and level detecting means for generating, when the level of the output signal of said second amplifier exceeds a predetermined value, a control signal for turning off said switching circuit.

3. A supervisory circuit as claimed in claim 1, wherein said a control signal appears on both of said first channel and said second channel, said selective decoder means selects and decodes said control signal appearing on said first channel.

4. A supervisory circuit as claimed in claim 1, wherein when a control signal appears on both of said first channel and said second channel, said selective decoder means selects and decodes one of said control signals which has arrived earlier than the other.

* * * * *